Feb. 14, 1928.  
J. F. WATERS  
STEAM COOKER  
Filed March 19, 1925
1,659,064
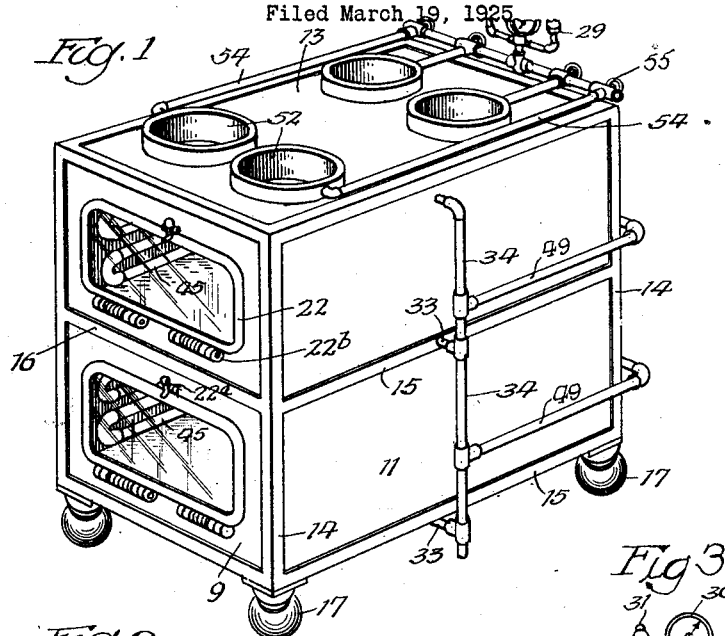
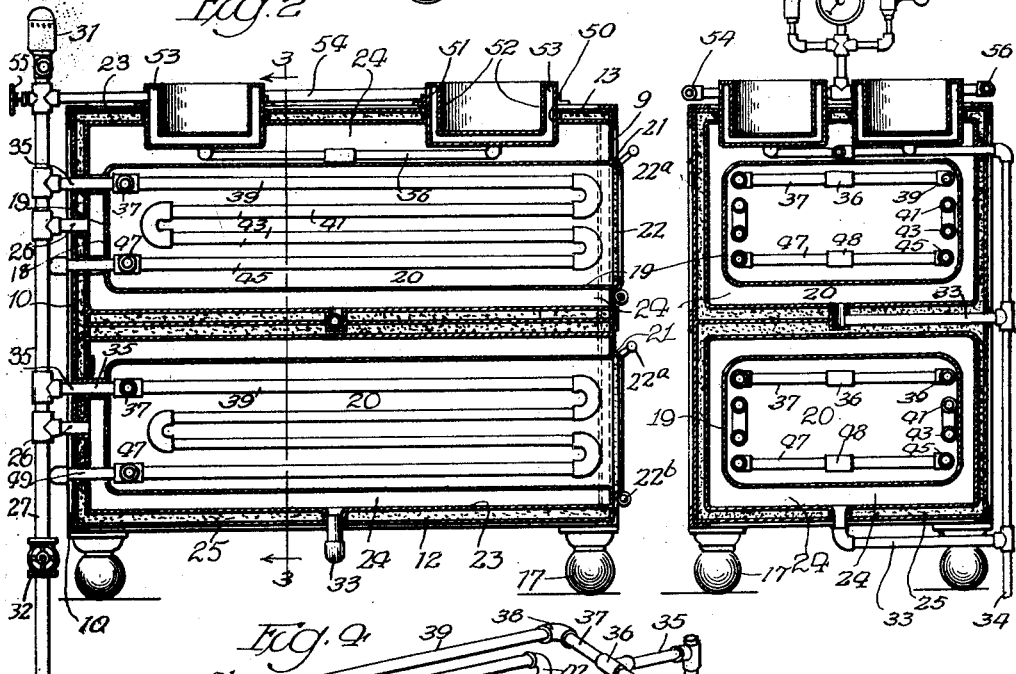
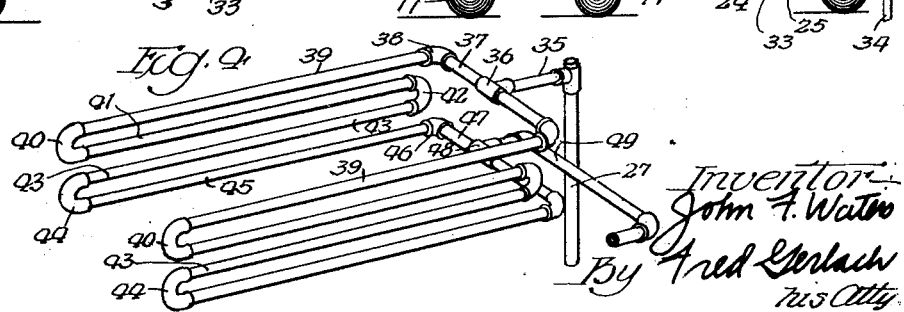
Inventor  
John F. Waters  
By Fred Gerlach  
his Atty.

Patented Feb. 14, 1928.

1,659,064

UNITED STATES PATENT OFFICE.

JOHN F. WATERS, OF CHICAGO, ILLINOIS.

STEAM COOKER.

Application filed March 19, 1925. Serial No. 16,611.

The invention relates to steam cookers.

In roasting beef, lamb, ham, corned beef, and the like, it is desirable to maintain the roasting chamber at a substantially uniform temperature, and to accomplishe this, steam has been proposed as the heating agent. In practice, it has been found that when steam is used, the products will not readily brown because of the moisture and condensation which forms in the roasting chamber. The primary object of the present invention is to provide a steam cooker in which provision is made for effectively eliminating moisture and condensation in the roasting chamber.

Another object of the invention is to provide a steam cooker which is of new and improved construction and in which provision is made for roasting and boiling.

Other objects of the invention will appear hereafter from the detailed description of the invention.

The invention consists in the several novel features hereinafter set forth and more particularly defined by the claims at the conclusion hereof.

In the drawing: Fig. 1 is a perspective of a steam cooker embodying the invention. Fig. 2 is a vertical section. Fig. 3 is a section taken on line 3—3 of Fig. 2. Fig. 4 is a perspective of one of the steam coils for eliminating moisture and condensation in the roasting chambers of the cooker.

The invention is exemplified in a cooker comprising a plurality of superposed roasting compartments which are disposed in an enclosure. The latter consists of a front wall 9, a rear wall 10, side walls 11, a bottom 12 and a top 13, all of which are formed of sheet metal and suitably secured in a rigid frame which comprises vertically extending angle bars 14, longitudinally extending bars 15, and cross-bars 16. The frame is provided at its bottom with legs or feet 17 for spacing the cooker from the floor upon which it is supported. Each roasting compartment comprises an inner substantially cylindrical longitudinally extending wall 19 and a wall 18 which is secured to the rear edges of wall 19. Walls 18 and 19 are formed of sheet metal and form together a roasting chamber 20; the front edges of each of the walls 19 are secured, as at 21, to the inner edges of wall 9 which form openings whereby the food products may be inserted into or removed from the roasting chambers. Doors 22 are hinged, as at 22$^b$, adjacent the openings in front wall 9. These doors when in their closed position serve to completely close the roasting chambers and to retain the heat therein. Handles 22$^a$ are pivotally mounted on the doors and are provided at their inner ends with hooked portions whereby the doors may be secured in their closed positions. Outer walls 23 are disposed adjacent the inner walls 19 respectively, and are held in spaced relation relatively thereto to form steam jackets 24 through which steam is adapted to circulate to heat the roasting chambers. Heat insulating material 25, such as asbestos, is secured to the outer surfaces of outer walls 23.

Steam is supplied to jackets 24 by means of branch pipes 26, which are connected to a steam supply pipe 27. The latter extends vertically and is secured to the back of the cooker. The upper end of said supply pipe is provided with a fitting to which is connected a steam gauge 30, a safety valve 29, and an air valve 31 which is adapted to release the vacuum in the steam jackets caused by the condensing of the steam when the pressure is shut off by the closing of a control valve 32 which is connected to supply pipe 27. The bottoms of the steam jackets 24 are connected by branch pipes 33 to an outlet pipe 34 so that the steam supplied to the jackets may be exhausted and the condensate drained.

For eliminating moisture and condensation, each roasting chamber is provided with a sinuous steam coil which is adapted to super-heat the air therein. Each coil comprises an inlet pipe 35 which is connected to the steam supply pipe 27 and extends forwardly through the steam jacket into the roasting chamber; a fitting 36 which is connected to the front end of inlet pipe 35; pipes 37 which extend laterally with respect to pipe 35 and are disposed adjacent the rear end of said roasting chamber; fittings 38 which are connected to the outer ends of pipes 37; pipes 39 which are connected to fittings 38 and extend forwardly along the sides of inner wall 19; semi-circular fittings 40 which extend downwardly and are connected to the front ends of pipes 39; rearwardly extending pipes 41 which are connected to fittings 40 and terminate adjacent the end wall 18 of the roasting chamber; fittings 42 which are connected to the rear ends of pipes 41; forwardly extending pipes 43 which are connected at their rear ends to fittings 42 and extend parallel to pipes 39 and terminate adjacent the front end of the roasting chamber; downwardly extending fittings 44 which are connected to the front ends of pipes 43; rearwardly extending pipes 45 which are connected to fittings 44 and terminate adjacent rear wall 18; laterally extending fittings 46 which are connected to the rear ends of pipes 45; pipes 47 which are connected to fittings 46 and extend inwardly adjacent the rear end of the roasting chamber; a fitting 48 which is connected to the inner ends of pipes 47; and an outlet pipe 49 which is connected to fitting 46 and steam outlet pipe 34.

In the upper roasting compartment, the outer wall 18 is extended at the top relatively to the innner wall 19 so that provision is made for a plurality of boiling wells. Each of these wells comprises an outer cylindrical sheet metal wall 50 which extends through an opening in top wall 13 and an opening in the outer wall 18 of the upper roasting compartment and with a bottom wall 51 which is suitably secured to the lower end of wall 50. An inner cylindrical wall 52 extends within outer wall 51 and is held in spaced relation relatively thereto to form a steam jacket 53. By disposing the lower ends of these boiling wells within the steam jacket of the upper roasting compartment, the steam therein is utilized to heat the wells. For additionally heating these wells which is necessary in boiling, steam jackets 53 are connected by branch pipes 54 to the steam supply pipe 27. Valves 55 are connected to said branch pipes to control the supply of steam delivered to the jackets. The bottom of each jacket 53 is connected by a pipe 56 to the outlet pipe 34 so that the steam and condensate in the jackets may readily be exhausted.

In the use of the cooker, hams, chunks of corn-beef, lamb, or other like food products which are to be roasted, will be placed on pans and inserted into the roasting chambers. Valve 32 will then be opened and steam admitted into the steam jackets 24 and the sinuous coils so that the air in the roasting chambers will be super-heated and the food products cooked in an improved manner by dry heat and readily browned. The products will remain in the cooker until the cooking thereof is completed, whereupon the valve 32 will be closed and the pans containing the products withdrawn. If boiling is desired, the articles may be placed in containers and lowered into the boiling wells which are heated by the steam in jacket 24 of the upper roasting compartment. If additional heat is necessary, the valves 55 may be opened and steam circulated through the steam jackets 53 until the articles are completely cooked.

The invention exemplifies a steam cooker of new and improved construction in which provision is made for super-heating the air in the interior of the roasting chambers so that the food products therein may be quickly cooked and browned by the use of dry heat.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a cooker, the combination of an inner wall-member adapted to form a roasting chamber for meats and the like, an outer wall-member held in spaced relation with respect to said inner wall-member and forming therewith a jacket around the roasting chamber, means for supplying steam to said jacket to heat the air in said chamber, said inner wall-member being closed to prevent the escape of steam from said jacket into the air in the roasting chamber, and means for superheating the air in the chamber to eliminate moisture and condensation, said last mentioned means being disposed in the chamber.

2. In a cooker, the combination of an inner wall-member adapted to form a roasting chamber for meats and the like, an outer wall-member held in spaced relation with respect to said inner wall-member and forming therewith a jacket around the roasting chamber, means for supplying steam to said jacket to heat the air in said chamber, said inner wall-member being closed to prevent the escape of steam from said jacket into the air in the roasting chamber, a closed coil in said chamber, and means for supplying steam to said coil to superheat the air in the chamber.

3. In a cooker, the combination of an inner wall-member adapted to form a roasting chamber for meats and the like an outer wall-member held in spaced relation with respect to said inner wall-member and forming therewith a jacket around the roasting chamber, means for supplying steam to said jacket to heat the air in said chamber, said inner wall-member being closed to prevent the escape of steam from said jacket into the air in the roasting chamber, a closed sinuous coil disposed in said chamber, and means for delivering steam from said supply means to the coil to superheat the air in the chamber.

4. In a cooker, the combination of an inner wall-member adapted to form a cooking chamber, an outer wall-member spaced relatively to said inner wall-member and forming therewith a jacket, means for supplying steam to said jacket to heat the air in the roasting chamber, said inner wall-member being closed to prevent the escape of steam from said jacket into the air in the roasting chamber, a closed coil disposed in said chamber and extending across the back and along the sides of the chamber, and a connection for delivering steam from the supply means to the coil to superheat the air in the chamber.

5. In a cooker, the combination of an inner wall-member adapted to form a chamber in which food products may be cooked, an outer wall-member spaced relatively to said inner wall-member and forming therewith a jacket, means to supply steam to said jacket to heat the air in the cooking chamber, a wall-member disposed within said jacket and adapted to form a chamber in which additional food products may be cooked, and means independent of the steam in the jacket for heating said chamber in which the additional food products may be cooked.

6. In a cooker, the combination of an inner wall-member adapted to form a chamber in which food products may be cooked, an outer wall-member spaced relatively to said inner wall-member and forming therewith a jacket, means to supply steam to said jacket to heat the air in the cooking chamber, a wall-member disposed within said jacket and adapted to form a chamber in which additional food products may be cooked, an outer wall-member extending around and spaced relatively to said wall-member and adapted to form therewith a jacket, and means to deliver steam to said last mentioned jacket to cook the additional food products independently of the steam in the first mentioned jacket.

Signed at Chicago, Illinois, this 14th day of March, 1925.

JOHN F. WATERS.